T. HOOKER.
SPEED INDICATOR.
APPLICATION FILED MAR. 28, 1910.
1,086,665.
Patented Feb. 10, 1914.
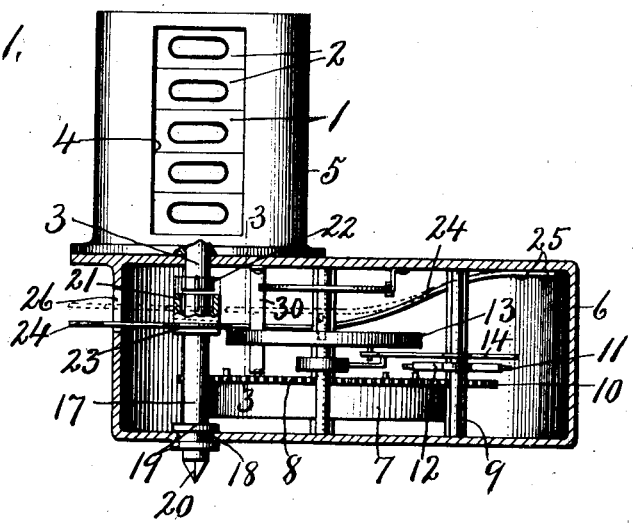
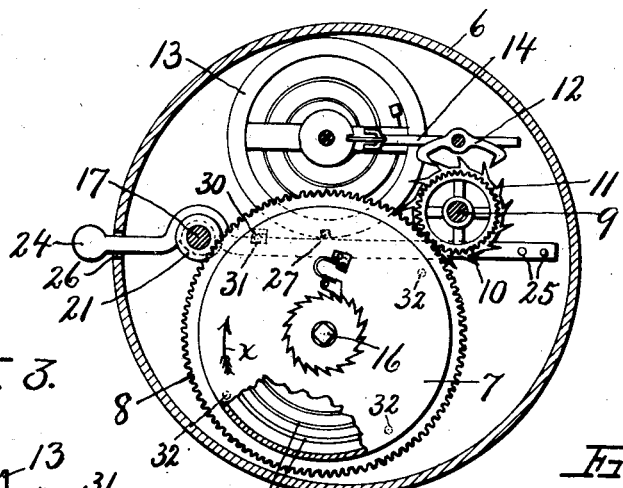
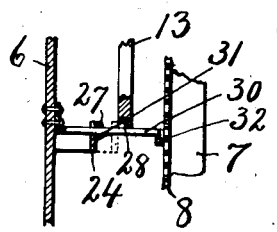
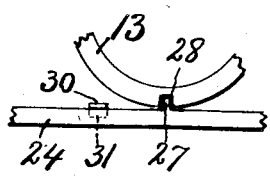
WITNESSES
E. J. Stout
H. E. Chase
INVENTOR
Thomas Hooker
BY Howard P. Denison
ATTORNEY.

UNITED STATES PATENT OFFICE.

THOMAS HOOKER, OF SYRACUSE, NEW YORK.

SPEED-INDICATOR.

1,086,665.   Specification of Letters Patent.   Patented Feb. 10, 1914.

Application filed March 28, 1910. Serial No. 551,847.

*To all whom it may concern:*

Be it known that I, THOMAS HOOKER, of Syracuse, in the county of Onondaga, in the State of New York, have invented new and useful Improvements in Speed-Indicators, of which the following, taken in connection with the accompanying drawings, is a full, clear, and exact description.

This invention relates to certain improvements in speed indicators for determining the number of revolutions for a predetermined interval of time of any revolving element, such as shafts, gears, pulleys and the like, and involves the use of a speed counter capable of operation in either direction at high or low speed and suitable chronometer controlled mechanism operatively connected to the counting mechanism for simultaneously stopping the counter and chronometer at the end of such predetermined interval of time during the testing operation.

The main object therefore is to combine any suitable speed counter with a chronometer in such manner that the operation of the counting mechanism and chronometer may be started simultaneously and stopped automatically and simultaneously at the end of a predetermined interval of time, so that the exact number of revolutions for such interval will be indicated by the counter without visual reference to any time piece.

Other objects and uses relating to specific parts of the device will be brought out in the following description.

In the drawings: Figure 1 is a top plan, partly in section, of a speed indicator embodying the various features of my invention. Fig. 2 is a face view of a chronometer showing the case in section and also showing the means under the control of the operator for starting and stopping the chronometer and counting mechanism. Fig. 3 is a sectional view taken on line 3—3, Fig. 1. Fig. 4 is a face view of a portion of the balance wheel showing the spring actuated stop mechanism therefor.

The speed counter —1— constituting a part of my invention may be of any well known construction in which a series of, in this instance five, coaxial indicating disks or wheels —2— are actuated primarily by a central shaft —3— across a suitable sight opening —4— in the case, as —5—, to successively indicate the number of revolutions of the shaft —3— up to 99,990, the first actuated disk of the series preferably indicating tenths.

The counter —1— is preferably secured at one end to a suitable chronometer case —6—
containing the necessary elements of a self actuating and self-governing time piece and other suitable mechanism which may be necessary to bring the shaft —3— in operative connection with the part to be tested.

As shown in Figs. 1 and 2, the chronometer comprises a revoluble spring motor case —7— having a gear —8— which imparts rotary motion to a shaft —9— through the medium of an intermeshing pinion —10—.

Secured to the shaft —9— is an escapement wheel —11— controlled by a suitable escapement pawl —12— operating in the usual manner in clock gears, said escapement pawl being controlled or governed by means of a balance wheel —13— through the medium of the usual connection —14—.

The motor drum or case —7— contains the usual coil spring motor —15— connected in the usual manner to the drum and to a shaft —16— upon which the motor drum is mounted.

A speed test shaft or spindle —17— is journaled in suitable bearings —18— on the casing —6— and is held against endwise movement by a grooved collar —19— constituting in this instance the journal which is seated in the bearings —18—, the outer end of the shaft or spindle —17— protruding through and beyond the outer face of the case —6— and is usually provided with a point —20— of angular cross section for engagement with the end of the shaft or other revoluble element the speed of which is to be tested. The inner end of this shaft is provided with a grooved collar or clutch section —21— feathered thereon, so as to slide axially and rotate with the spindle, said collar being movable into and out of engagement with a corresponding clutch section —22— on the adjacent end of the counter spindle —3—, said shafts or spindles —3— and —17— being coaxial and their adjacent ends inclose proximity so that the clutch section —21— may be easily shifted into and out of operative connection with the spindle —3—.

In order that the clutch section —21— may be moved axially, it is provided with an annular groove —23— or at least opposite annular shoulders for the reception between them of a clutch shifting member —24—. This clutch shifting member —24— preferably consists of a flat spring secured at —25— to one end of the casing —6— and having its opposite end protruding through an opening —26— in one side of the casing where it is provided with a suitable hand piece by which the spring may be manipulated. This spring is tensioned to automatically withdraw the clutch section —21— out of engagement with the shaft or spindle —3—, and for this purpose its intermediate portion near its outer end is seated in the groove —23— of the clutch. This spring is also utilized as a brake or stop mechanism for the balance wheel —13— and for this purpose its central portion travels in close proximity to one side of the balance wheel and is provided with a tooth or shoulder —27— for engagement with the corresponding notch —28— in the adjacent side of said balance wheel, so that when the spring is in its normal position the tooth —27— is spring pressed into engagement with the notch —28— to effectively stop the operation of the chronometer mechanism and at the same time the clutch is withdrawn by the spring out of operative connection with the counter spindle —3—, thus leaving the test spindle —17— free to rotate independently of the counter mechanism or chronometer.

The clutch —21— is thrown into operative connection with the counter spindle —3—, at the will of the operator, by means of the shifting device or spring —24— and is held in such engagement or connection by a spring detent —30— which in this instance is secured to one end of the case —6— and extends transversely of the spring —24— and is provided with a tooth —31— lying in the path of movement of said spring, so that when the latter is operated to force the clutch into engagement with the spindle —3— to operatively connect the test spindle —17— to the counter mechanism, the detent —30— will engage and hold said spring and clutch in their operative positions and at the same time the detent —27— for the balance wheel will be moved out of engagement therewith, thereby releasing said balance wheel and permitting the operation of the chronometer, it being understood that before the clutch is thrown to its operative position the pointed end of the test spindle —17— has been brought into engagement with the shaft or other revoluble element, the speed of which is to be tested.

As soon as the clutch mechanism is connected in the manner just described, the counter and chronometer will operate simultaneously or until the clutch —21— is released and automatically returned to its inoperative position by the spring —24—. This latter operation is effected through the medium of one or more tripping devices, as pins —32—, on one of the revoluble chronometer elements, as the motor drum —7— or gear —8—, which rotate in the direction indicated by the arrow —x—, Fig. 2, the tripping devices —32— being located so as to travel in the path and engage one end of the spring detent —30— and thereby trip the latter from its holding position to release the spring —24— and allow it to return the clutch —21— to its inoperative position at which time the counter mechanism and chronometer mechanism are stopped simultaneously in the manner previously described.

When more than one of the tripping devices —32— are employed, they are preferably spaced a uniform distance apart, the number depending somewhat upon the speed of rotation of the motor drum and also upon the interval of time during which it may be desired to operate the counter mechanism.

Assume for example that the motor drum or gear —8— makes one complete revolution every twenty-four seconds and that it is desired to operate the counter during an interval of six seconds, in which case four of the tripping devices —32— would be employed, each moving through the intervening space in six seconds under which conditions it is apparent that when one of the tripping devices is in position to trip the detent —30— the chronometer and counter mechanisms will be in a normal position of rest. Now if it is desired to test the speed of a revoluble element, the point —20— of the testing spindle —17— is first brought into contact with the center of such element with sufficient pressure to cause the rotation of the spindle —17— and when the operator is ready to make the test, the free end of the shifting member —24— is operated by hand to engage the clutch —21— with the counter spindle —3— by which operation the spring is moved into holding engagement with the detent —30— and at the same time is moved out of engagement with the balance wheel —13—, thereby starting the chronometer and counter mechanism at the same time, whereupon the manual pressure upon the shifting device —24— is relieved and allows the detent to hold it in its shifted position.

As the motor drum —7— or gear —8— is rotated by means of the spring —15— during the predetermined interval of, in this instance six seconds, the first forwardly advancing tripping device —32— will encounter and trip the detent —30— at the end of such interval, thereby releasing the spring —24— which automatically returns to its starting position, thereby withdrawing the clutch —21— from engagement with the counter spindle —3— and at the same time forcing the detent —27— into engagement with the balance wheel —13— to stop further action of the chronometer. It is now clear that during this operation of the counter spindle —3— the disks —2— will have been rotated and will indicate the exact number of revolutions of the test spindle —17— and that of the revoluble element with which it is engaged for the particular interval of time, in this instance six seconds, previously determined upon.

As previously intimated the number of tripping devices —32— is immaterial and depends wholly upon the speed of revolution of the drum —7— and also upon the interval of time it may be desired to operate the counter mechanism and that I do not limit myself to any particular number of tripping devices nor to the exact construction and relative arrangement of the mechanism for starting and stopping the counter in synchronism with the starting and stopping the chronometer.

The spring motor —15— may be rewound or retensioned by the application of a suitable key to the square end of the shaft —16— in the usual manner for winding clocks.

What I claim is:

1. A speed indicator comprising a counter mechanism, a driving shaft therefor, a test spindle adapted to contact with the part the speed of which is to be tested but normally disconnected from the shaft, self-retracting means operable at will for connecting the spindle to the shaft, a detent for holding said means in operative position, chronometer actuated means for tripping the detent at the end of a predetermined interval of time to allow the return of the self-retracting means, and additional means actuated by the self-retracting means for automatically stopping the chronometer actuated means.

2. A speed counter having a driving shaft, a test spindle co-axial with the shaft but normally disconnected therefrom, self-retracting means operable at will for connecting the spindle to the shaft, a detent for holding said means in operative position, chronometer actuated means for tripping the detent to permit the return of the self-retracting means, and additional means actuated by the return of the self-retracting means for stopping the chronometer actuated means.

3. A speed indicator comprising a counter mechanism including a plurality of co-axial disks and driving shaft therefor, a test spindle co-axial with said shaft but normally disconnected therefrom, a clutch for connecting the spindle to the shaft, a chronometer, means normally holding the chronometer against action, self-retracting means operable at will for operating the clutch to connect the spindle to the shaft and to simultaneously withdraw the chronometer holding means from its holding position, a detent for holding said clutch operating means in operative position, and additional means actuated by the chronometer for tripping the detent to allow the return of the clutch and chronometer holding means to their normal positions at the end of a predetermined interval of time.

4. A speed indicator comprising a counter having a driving shaft, a test spindle co-axial with but normally disconnected from the shaft, a clutch for connecting the spindle to the shaft, a chronometer, a stop normally holding the chronometer against action, self-retracting means for throwing the clutch into action and simultaneously throwing the stop from its holding position, a detent for said self-retracting means, and chronometer controlled means for tripping the detent.

5. A speed indicator comprising a casing having alined openings in opposite sides thereof, a test spindle journaled in one of the openings, a counter mechanism having a driving shaft projecting through the opposite opening, clutch connections between the spindle and shaft, a chronometer, a stop for the chronometer, voluntarily operated means for throwing the clutch into action and simultaneously shifting the stop from its holding position, a detent for holding said means in its adjusted position, and chronometer actuated means for shifting the detent at the end of a pre-determined interval of time during which said chronometer is actuated, said voluntarily operated means being self returning to disconnect the clutch to return the stop to its holding position when the detent is tripped.

6. In a speed indicator, a casing having alined openings in opposite sides thereof, a test spindle projecting through one opening, a counter mechanism having a driving shaft projecting through the opposite opening and normally disconnected from the spindle, a clutch for connecting the spindle and shaft, a chronometer having a balance escapement, a stop co-acting with the escapement to normally hold the chronometer against action, self-retracting means for shifting the clutch and stop from their normal positions, a detent for holding the shifting means in its shifted position, and chronometer actuated means for tripping the detent.

In witness whereof I have hereunto set my hand on this 19th day of March, 1910.

THOMAS HOOKER.

Witnesses:
H. E. CHASE,
A. L. HUMPHREY.